Aug. 11, 1970  W. H. GORDER ET AL  3,524,047
PHOTOSENSITIVE SENSING SYSTEM
Filed Aug. 21, 1967  2 Sheets-Sheet 1

INVENTORS:
WILLIAM H. GORDER
NORMAN D. KLINE

BY Donald F Voss
ATTORNEY

United States Patent Office 3,524,047
Patented Aug. 11, 1970

3,524,047
PHOTOSENSITIVE SENSING SYSTEM
William H. Gorder and Norman D. Kline, Rochester, Minn., assignors to International Business Machines Corporation, Armonk, N.Y., a corporation of New York
Filed Aug. 21, 1967, Ser. No. 661,927
Int. Cl. G01n 21/30; G06k 7/10; H03k 3/21
U.S. Cl. 235—61.11                                    5 Claims

ABSTRACT OF THE DISCLOSURE

A light emitting diode and phototransistor are positioned on opposite sides of the card path. The turn-on delay time of the phototransistor is a function of light level. There are essentially two light levels. The phototransistor is at one light level when sensing a hole in a record card and is at another light level when the record card screens the phototransistor from the light emitting diode. The light emitting diode is turned on for a period of time which is substantially less than the low light level turn-on delay time of the phototransistor. The amplified output of the phototranssitor is applied to logic circuitry which determines whether or not data in the form of a hole has been sensed.

BACKGROUND OF THE INVENTION

Field of the invention

This invention generally relates to apparatus for sensing data, and more particularly for sensing data in the form of punched holes in record cards and still more particularly to a photosensing system where the light source is operated in a pulsed mode for a period of time which is less than the low light level turn-on delay time of the photosensitive device.

Description of the prior art

Photosensing systems of the prior art operate with the light source continuously energized. Prior art photosensing systems have not recognized that the signal-to-noise ratio can be improved substantially if the light source is pulsed for a period of time which is less than the low light level turn-on delay time of the photosensitive device. Further, since the light source is turned on for a short period of time, the life of the light source is increased considerably. This also results in improved reliability.

SUMMARY OF THE INVENTION

The principal object of the invention is to provide an improved photosensing system which:

(a) has a very high signal-to-noise ratio;
(b) increases the life of the light source;
(c) improves reliability;
(d) reduces temperature sensitivity; and
(e) is relatively inexpensive and does not require potentiometers for adjusting the intensity of the light source.

DESCRIPTION

Figure 1:
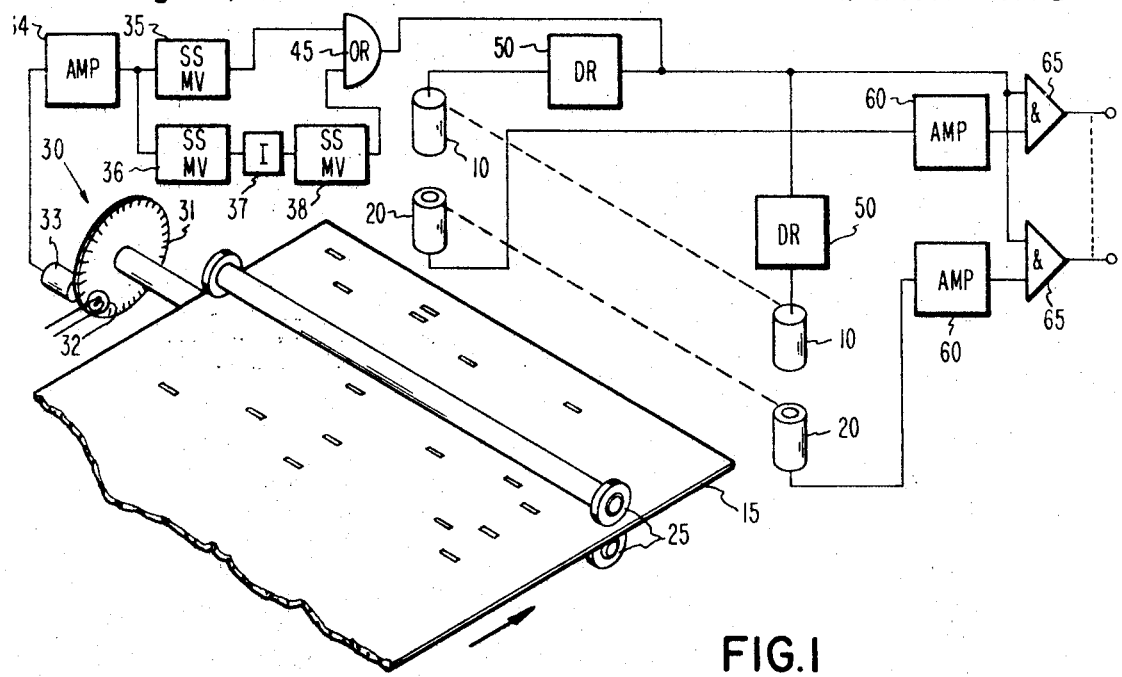
FIG. 1 is a view illustrating the invention embodied as a card reader.

With reference to the drawings and particularly to FIG. 1, the invention is shown by way of example as including a column of light sources 10 and corresponding in number and to the spacing of data index positions of record card 15. In this particular example, light sources 10 are shown as being disposed above the card path and a corresponding number of phototransistors 20 are located below the card path. The location of light sources 10 and phototransistors 20 could be reversed without affecting the scope of the invention. In fact, the arrangement for mounting light sources 10 and phototransistors 20 can vary depending upon the source or manufacturer of the particular components. In most instances, these components will be mounted on printed circuit boards of the type well known in the art. Further, if it is not possible to have the card 15 wipe the components clean as it passes transversely between them, then it is desirable to place glass covers on both sides of the card path so that the card wipes the glass covers clean and card dust is prevented from accumulating.

In this particular example, light sources 10 are gallium arsenide light emitting diodes. These diodes emit in a narrow band several hundred angstroms wide and centered about a wavelength of $0.9\mu$. At this wavelength, the silicon phototransistors 20 operate at near 90% of peak efficiency. This spectral match is essentially constant as the temperature and current in the light emitting diodes 10 vary.

Cards 15 are fed relatively to light sources 10 and phototransistors 20 by means of cooperating feed rollers 25. In this particular example, it is assumed that cards 15 are fed at such a rate that the time period for a data index position is approximately 1 millisecond. Photoelectric emitter 30 is driven in synchronism with the movement of cards 15. Emitter 30 consists of emitter disc 31, light source 32 and photosensitive element 33. The pulses from emitter 30 are used for generating pulses having a ten microsecond duration occurring at a time when a perfectly punched hole is approximately 0.0052 inch off center of the optical path center line at card velocity of 87 inches per second. The output of photosensitive element 33 is amplified by amplifier 34 and the output thereof triggers singleshot multivibrator 35. The pulse from 35 has a time duration of 10 $\mu$seconds. The output of amplifier 34 is also applied to singleshot multivibrator 36 which develops a pulse having a duration of 100 $\mu$seconds. The output of 36 is applied to inverter 37 and its output is connected to singleshot multivibrator 38. The pulse from 38 has a 10 $\mu$second duration. The outputs of 35 and 38 are used for energizing drivers 50 via OR circuit 45.

Figure 4:
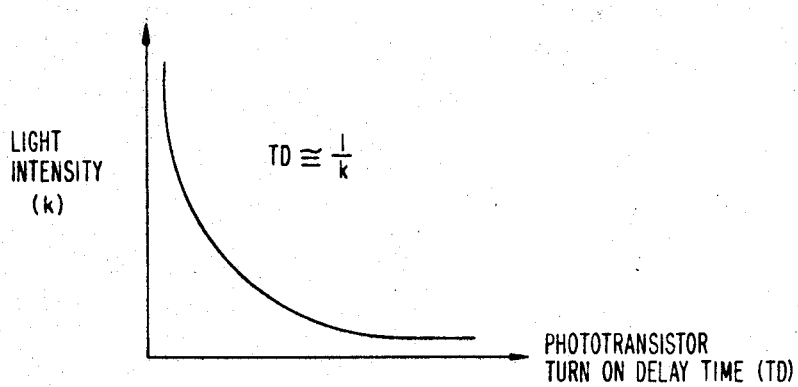
FIG. 4 is a diagram illustrating light intensity versus phototransistor turn-on delay time.
Figure 5:
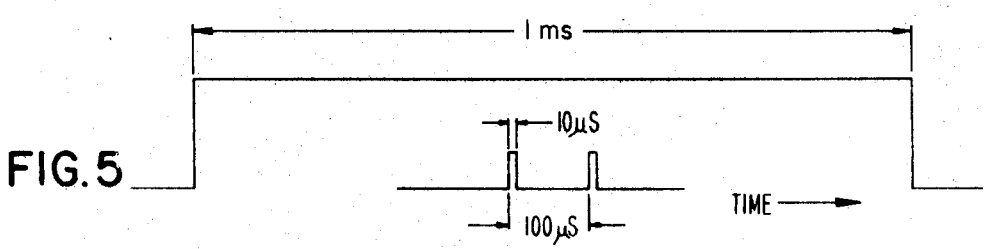
FIG. 5 is a diagram illustrating the time duration of a data index period, i.e., a punched hole, and the two sampling pulses occurring within this time.

Light sources 10 are turned on only during the time that sampling pulses are available from OR circuit 45. The primary reason for pulsing the light sources 10 is that a significantly improved signal-to-noise ratio can be obtained. The signal-to-noise ratio can be defined as the amount of current flowing in phototransistor 20 when a hole is sensed, compared to the amount of current flowing when a hole is not present, i.e., when phototransistor 20 is shielded from light source 10 by card 15. In FIG. 4, it is seen that the phototransistor turn-on delay time increases significantly as the light intensity decreases. Advantage is taken of this phenomena by pulsing the light sources 10 for a duration less than the turn-on delay time of phototransistors 20 at the light level which exists when card 15 shields phototransistor 20 from light source 10. This low light level turn-on delay time is approximately 30 μseconds. In this example, when a hole is present the current in phototransistor 20 reaches approximately 930 microamps during the ten microsecond sampling period. However, if a hole is not present, the current flowing in phototransistor 20 is only approximately 0.9 microamp during the ten microsecond sampling period. This results in a signal-to-noise ratio of approximately 1030. Further, in addition to the improved signal-to-noise ratio, the life of the light source 10 is vastly extended because it is operated at a 2% duty cycle, i.e., 20 microseconds out of 1000 microseconds.

Figure 2:
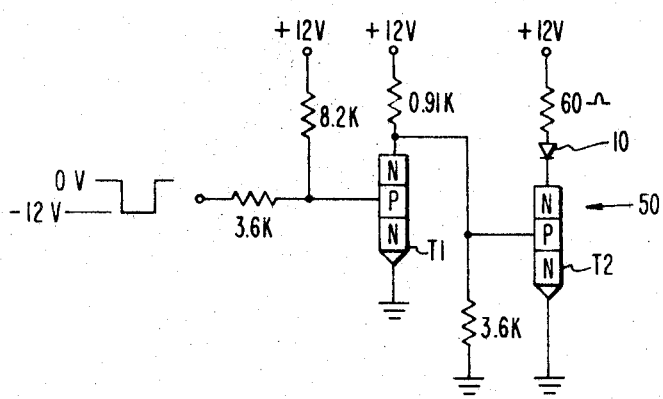
FIG. 2 is a schematic circuit diagram of the driver for the light emitting diode.

Each of the drivers 50 can energize one or more light sources 10; however, in this example, there is a driver 50 for each light source 10. The driver 50 is shown in detail in FIG. 2. It should be noted that the sampling pulses are shown as positive going pulses whereas the pulse for operating the driver 50 is a negative going pulse. Further, in FIG. 1, the logic is shown as positive logic. Hence, to operate the driver 50 of FIG. 2, it would be necessary to invert the sampling pulse or use negative logic. It is seen that the sampling pulse swings between zero and −12 volts. When the input to the base of transistor T1 is at zero volts, transistor T1 is ON. With transistor T1 ON, its collector is at approximately 0.1 volt, and this holds transistor T2 OFF. When the sampling pulse occurs, the input goes to −12 volts and T1 turns OFF. The collector of T1 consequently rises and T2 turns ON. The light emitting diode 10 is connected in the collector circuit of T2 and therefore, as T2 turns ON, the light emitting diode 10 is energized. Of course, other suitable driving circuits could be used for energizing light emitting diode 10. When driving the light emitting diode 10 with approximately 100 milliamps, the drive current stability is optimum if the number of light emitting diodes 10 connected in the collector circuit is four or less.

In the reading system of FIG. 1, the output from the phototransistors 20 is applied to amplifiers 60 and the output of amplifiers 60 are connected to inputs of logical AND circuits 65. The AND circuits 65 are conditioned by the sampling pulses passed via OR circuit 45. Thus, in this particular system, the holes are essentially read twice for reliability purposes. Of course, this is not necessary for the operation of the present invention.

Figure 3:
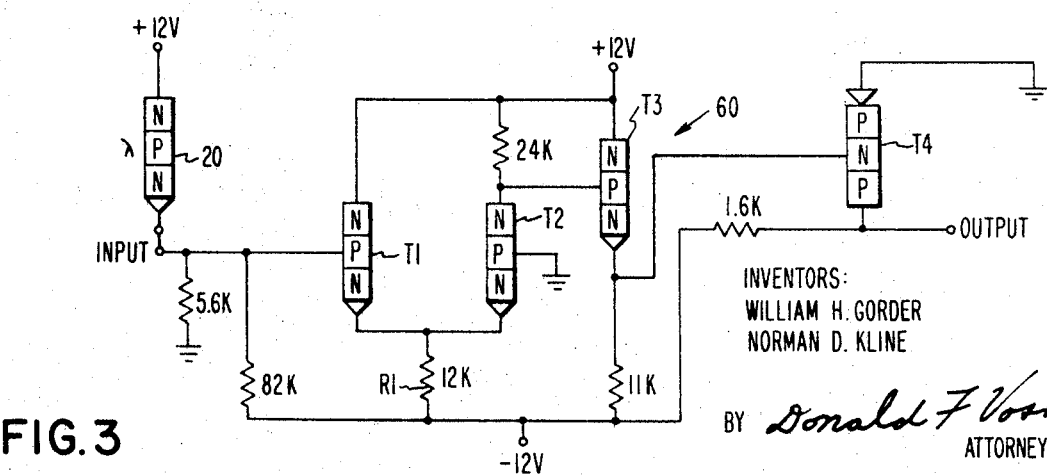
FIG. 3 is a schematic circuit diagram of the amplifier for the phototransistor.

The amplifier 60 can be conventional; however, a suitable amplifier is shown in detail in FIG. 3. The input of amplifier 60 is essentially a differential stage formed by transistors T1 and T2. The base of T2 is referenced to ground and the input signal coming from phototransistor 20 is applied to the base of T1. The collector of transistor T2 is connected to the base of transistor T3. Transistor T3 is connected in an emitter follower configuration. The emitter of transistor T3 is connected to the base of transistor T4 which is connected to operate in a switching mode. The output is taken from the collector of transistor T4.

Figure 6A:
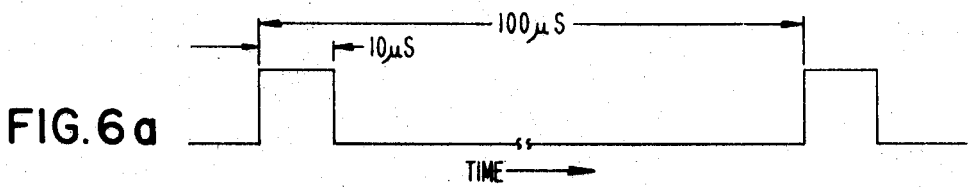
FIG. 6a is a diagram showing the pulses for energizing the drivers for the light emitting diodes.
Figure 6B:
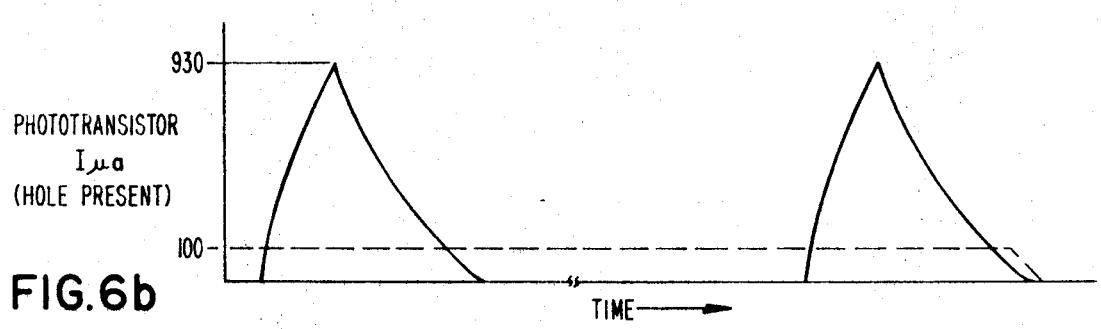
FIG. 6b is a diagram showing the output of the phototransistor when reading a punched hole.
Figure 6C:
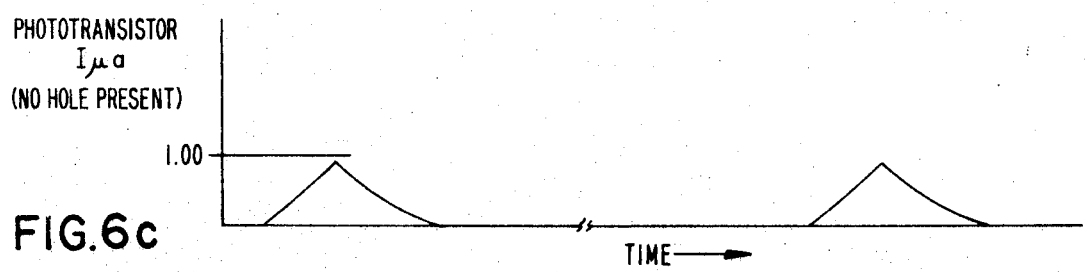
FIG. 6c is a diagram showing the output of the phototransistor during read time in the absence of a punched hole, however, with the scale of the output of the phototransistor greatly increased with respect to the scale shown in FIG. 6b.

As a card is being read, if no hole is present, T1 is conducting very little current and most of the current flowing through the common emitter resistor R1 is being conducted by T2. Under this condition, the collector potential of T2 is down and consequently the emitter potential of T3 is down. With the emitter potential of T3 down, transistor T4 is ON and the output is at approximately ground potential. It should be noted that amplifier 60 has a threshold of 100 μamps, see FIG. 6b, which is well above the 0.9 μamp conducted by 20 when a hole is not present as shown in FIG. 6c.

When a hole is present, the associated phtotransistor 20 is conducting a maximum amount of current, and consequently T1 conducts more current and this causes transistor T2 to conduct less current. As transistor T2 conducts less current, its collector potential rises and this causes the emitter potential of transistor T3 to go up, whereby transistor T4 turns OFF. With transistor T4 OFF, its collector potential goes to approximately the −12 volt supply, and thus the output goes from approximately ground to −12 volts. Of course, to be consistent with respect to FIG. 1, the output would be inverted before being applied to the associated AND circuit 65 or it would be necessary to use negative logic.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for sensing data represented in coded form on a document conveyed along a document path comprising:
   a light source positioned to illuminate at least one data index position on said document as said document moves;
   a phototransistor having low and high light level turn-on delay times positoned to sense the light level at said one data index position, said light level being low if data is absent and high if data is present; and
   means for pulsing said light source for a time duration shorter than said low light level turn-on delay time and means for synchronizing movement of said documet with said pulsing means so that when said one data index position is in position to be sensed by said phototransistor said pulsing means is activated.

2. The apparatus of claim 1 wherein said light source is a light emitting diode.

3. The apparatus of claim 1 wherein said synchronizing means comprises a photoelectric emitter.

4. The apparatus of claim 1 wherein the low light level turn-on delay time of said phototransistor is greater than ten microseconds and the high light level turn-on delay time is less than ten microseconds.

5. Apparatus for sensing data represented in coded form by punched holes in a document conveyed along a document path comprising:
   a plurality of light sources positioned on one side of said document path to illuminate data positions as said document is moved into sensing position;
   a plurality of phototransistors positioned on another side of said document path to sense said data positions, said plurality of phototransistors having low and high light level turn-on delay times, the light level at said plurality or phototransistors when sensing a document is low if a hole is absent and high if a hole is present;
   means for pulsing said light sources for a time duration less than said low light level turn-on delay time and means for synchronizing movement of said document with said pulsing means so that each time said data positions are in position to be sensed said pulsing means is activated.

References Cited

UNITED STATES PATENTS

| | | | |
|---|---|---|---|
| 2,975,967 | 3/1961 | Martin | 235—61.115 |
| 3,321,637 | 5/1967 | Beltz et al. | |
| 3,351,744 | 11/1967 | Masterson | 235—61.115 |
| 3,443,109 | 5/1969 | Broom et al. | |

MAYNARD R. WILBUR, Primary Examiner

T. J. SLOGAN, Assistant Examiner

U.S. Cl. X.R.

250—219; 307—311